United States Patent [19]

Spridco

[11] Patent Number: 4,583,626

[45] Date of Patent: Apr. 22, 1986

[54] CENTRIFUGALLY ACTUATED WET PLATE CLUTCH

[75] Inventor: Dale R. Spridco, Milwaukee, Wis.

[73] Assignee: The Falk Corporation, Milwaukee, Wis.

[21] Appl. No.: 553,852

[22] Filed: Nov. 21, 1983

[51] Int. Cl.[4] .......................................... F16D 25/063
[52] U.S. Cl. .................. 192/70.25; 192/85 F; 192/103 F; 192/105 A
[58] Field of Search ............ 192/70.25, 85 AA, 85 F, 192/103 R, 103 F, 105 A, 105 F

[56] References Cited

U.S. PATENT DOCUMENTS

| | | | |
|---|---|---|---|
| 2,183,761 | 12/1939 | Aspinwall et al. | |
| 2,256,258 | 9/1941 | Flickinger | 192/85 F |
| 2,960,202 | 11/1960 | Stevens et al. | 192/85 F |
| 3,262,529 | 7/1966 | Kramer | |
| 3,295,646 | 1/1967 | Peterson | 192/85 F |
| 3,352,395 | 11/1967 | Hilpert | |
| 3,819,020 | 6/1974 | Smith | |
| 3,872,956 | 3/1975 | Herr et al. | 192/85 F |
| 4,173,269 | 11/1979 | Craig | |
| 4,502,582 | 3/1985 | Lech, Jr. et al. | 192/105 F X |

FOREIGN PATENT DOCUMENTS 1216537 4/1960 France ......................... 192/85 F Primary Examiner—W. R. Wolfe
Attorney, Agent, or Firm—Quarles & Brady

[57] ABSTRACT

A centrifugally actuated wet plate clutch which is actuated by the centrifugal pressure of its cooling and lubricating fluid. An input housing defines a radial cavity which is partially filled with the fluid and contains sets of interleaved clutch plates respectively mounted to the housing and to an output shaft which is rotatable independent of the housing. A piston adapted to urge the clutch plates together is mounted in the cavity and has a net piston surface opposing the clutch plates. When the housing is accelerated in rotational speed, centrifugal pressure develops in the fluid and acts on the piston to gradually urge the clutch plates together, thereby engaging the clutch.

4 Claims, 4 Drawing Figures

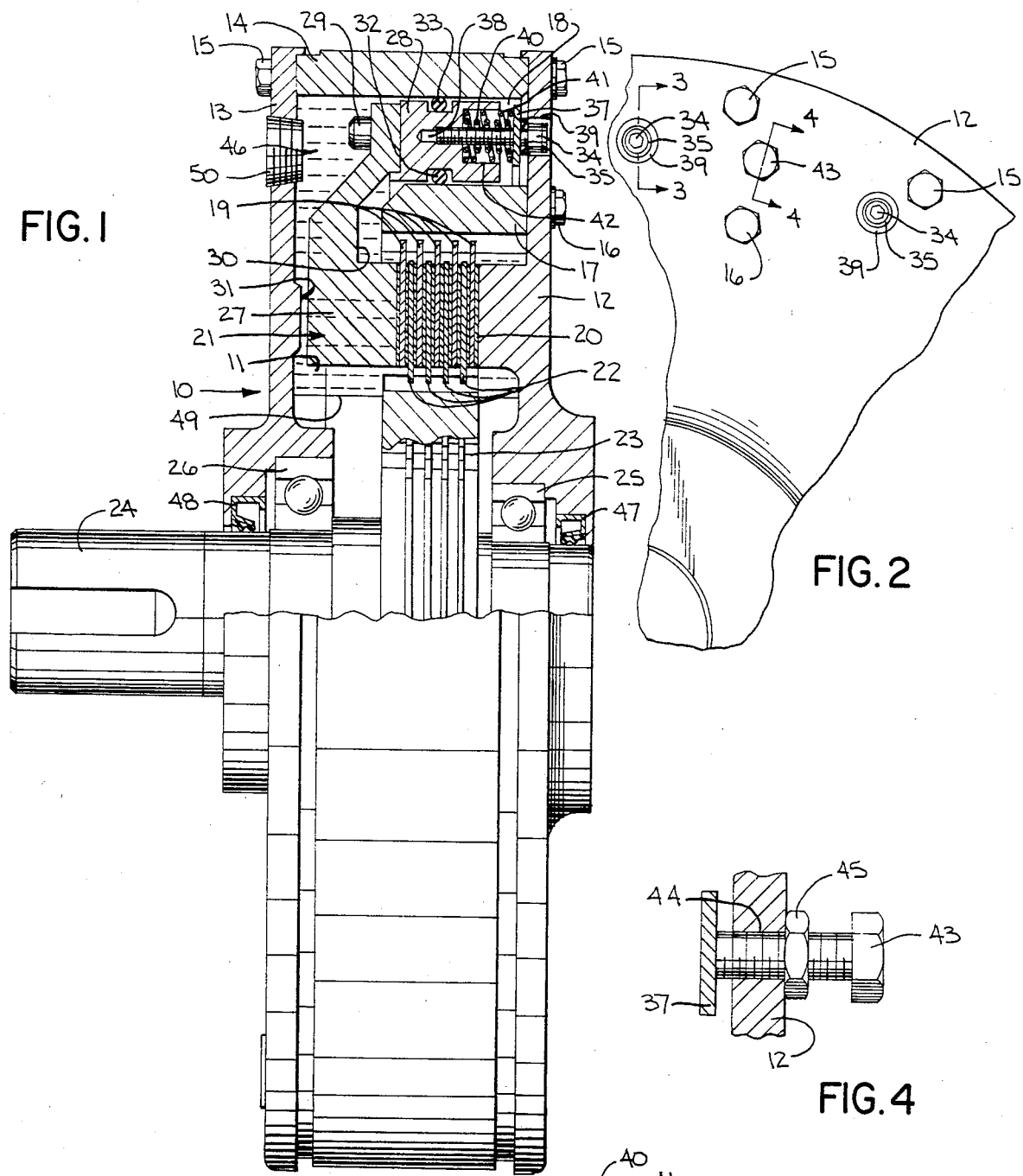
FIG. 1
FIG. 2
FIG. 4
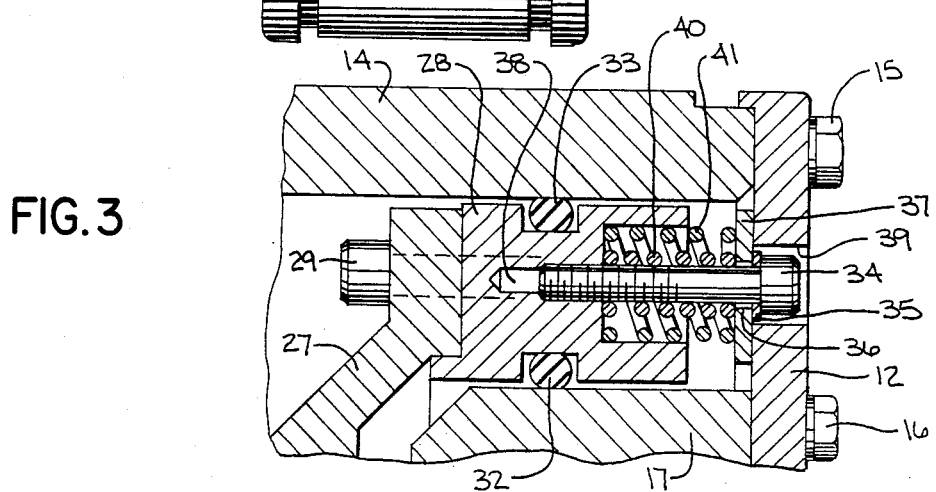
FIG. 3

CENTRIFUGALLY ACTUATED WET PLATE CLUTCH

FIELD OF THE INVENTION

The present invention relates to centrifugally actuated clutching apparatus, and particularly to a wet plate clutch which is actuated by fluid pressure generated centrifugally therein.

DESCRIPTION OF THE PRIOR ART

Centrifugally actuated clutch mechanism in rotative power systems are used to provide torque transmission as a function of input speed. At low speeds, little or no torque will be conveyed since the mechanisms will not have been actuated by sufficient centrifugal forces to engage the clutch. As the input speed increases, the torque transmitted will likewise increase as the centrifugally controlled pressure exerted on the clutch elements increases. The result can be a gradual engagement of the clutch in proportion to the speed of the driving mechanism.

Prior art centrifugally actuated wet plate clutches generally fall into two categories. One category employs centrifugally actuated valving to control the delivery of fluid from an external pressure source as in U.S. Pat. No. 3,819,020 issued June 25, 1974 to Lyle B. Smith and U.S. Pat. No. 3,352,395 issued Nov. 14, 1967 to Conrad R. Hilpert. The other category uses fly-weights operating against an inclined surface to engage the clutch elements as in U.S. Pat. No. 2,183,761 issued Dec. 19, 1939 to Robert E. Aspinwall, et al.

This invention does not employ the added complexity or weight of centrifugally actuated valving or fly-weights. Instead, it employs a very simple structure using the cooling and lubricating fluid, operating directly on a piston, to engage the clutch elements. No external pressure source is required as the pressure developed in the cooling and lubricating fluid by centrifugal force is employed to actuate the clutch.

SUMMARY OF THE INVENTION

In accordance with the invention there is provided a clutching apparatus for connecting driving and driven mechanisms. The apparatus includes a rotatable housing adapted to be connected to the driving mechanism and defining a radial cavity adapted to be partially filled with a fluid. Clutch plates in the cavity are operatively connected for rotation with the housing and the driven mechanism, respectively. A piston in the cavity has a net piston surface opposing the clutch plates which causes the piston to engage the clutch under the influence of centrifugal pressure of the fluid partially filling the clutch.

In a clutching mechanism in accordance with the present invention, when the radial cavity is partially filled with a cooling and lubricating fluid and the housing is rotated by the driving mechanism at a sufficient speed, centrifugal force will cause the fluid to migrate radially outward in the radial cavity. The fluid speed will lag the housing speed as the latter is increased due to the fluid's inertia. As the fluid accelerates to approach the speed of the housing, pressure will develop in the fluid proportional to the square of the rotational speed of the fluid. The fluid pressure as thus developed will act on a net piston surface opposite the clutch plates to gradually urge the piston to compress the clutch plates together and transmit power to the driven mechanism.

It is a principal object of the invention to provide a simplified centrifugally actuated wet plate clutch without the added complexity and weight of centrifugally actuated valving or fly-weights.

It is another object of the invention to provide a centrifugally actuated wet plate clutch which permits gradual engagement as the speed of the driving mechanism increases.

It is a further object of this invention to provide a centrifugally actuated wet plate clutch which uses its cooling and lubricating fluid under centrifugal pressure directly acting on a net piston surface to engage the clutch thereby eliminating the need for an external pressure source.

The foregoing and other objects and advantages of the invention will appear in the following detailed description. In the description reference is made to the accompanying drawings which illustrates a preferred embodiment of the invention.

BRIEF DESCRIPTION OF THE DRAWINGS

FIG. 1 is a view in elevation and partially in section of a centrigual wet plate clutch apparatus in accordance with the present invention;

FIG. 2 is an end fragmentary view in elevation of the input side of the apparatus shown in FIG. 1;

FIG. 3 is an enlarged, fragmentary view of section illustrating the spring biasing mechanism and viewed from the plane of the line 3—3 of FIG. 2; and FIG. 4 is an enlarged view in section of the annular plate adjusting mechanism and viewed from the plane of the line 4—4 of FIG. 2.

DETAILED DESCRIPTION OF THE INVENTION

Referring to the drawings, a rotatable input housing generally referred to as 10 defines a radial cavity 11 and has a front end plate 12, a rear end plate 13, and a cover 14 spanning the end plates and bolted thereto by a plurality of machine screws 15. The input housing 10 is adapted to be connected to and rotated by a driving mechanism (not shown) such as a diesel engine. A plurality of machine screws 16 bolt a ring member 17 to the inside face of the front end plate 12 thereby defining an annular channel 18 between the outside periphery of the ring member 17 and the inside periphery of the cover 14. The ring member 17 is internally splined and slidably mounts a first set of spaced clutch plates 19 which are disposed between an annular land 20 formed on the inner face of the front end plate 12 and an annular piston generally referred to as 21.

A second set of clutch plates 22 are interleaved with the first set of clutch plates 19 and have their inner diameters slidably splined to a hub 23 formed on an output shaft 24. When the clutch is disengaged, the output shaft 24 is rotatable independent of the input housing 10 on ball bearings 25 and 26 mounted in the front end plate 12 and the rear end plate 13 of the housing 10. The output shaft 24 is adapted to be connected to a driven member (not shown) such as a marine transmission.

The annular piston 21 has an annular clutch engaging arm 27 and an annular spring containing plunger 28 bolted thereto by a plurality of cap screws 29. The spring plunger 28 is received in the channel 18 between the ring member 17 and the cover 14. The annular spring containing plunger 28 is axially slidable in the annular channel 18 and is sealed on its inside diameter by an inner "O" ring 32 and on its outside diameter by an outer "O" ring 33. The annular clutch engaging arm 27 is provided with an annular recess 30 which confronts the axial end of the ring member 17 and provides clearance with the ring member 17 in all positions of operation. The inner face of the rear end plate 13 has an annular land 31. The distance between the face of the annular land 31 and the surface of the annular clutch engaging arm 27 opposite the clutch plates is such that when the piston 21 abuts the annular land 31, the plunger 28 does not become unsealed from the channel 18.

A plurality of cap screws 34 each mount a washer 35 and extend through holes 36 in an annular plate 37 disposed against the inner face of the front plate 12 in the channel 18. The holes 36 are sized to provide a sliding fit between the cap screw shanks and the annular plate 37. The cap screws 34 are then threaded into a plurality of blind, counter-sunk holes 38 in the face of the plunger 28 opposite the clutch engaging arm 27. The front end plate 12 has a plurality of through holes 39 into which the washers 35 and the heads of the cap screws 34 extend so that the cap screws 34 are accessible for adjustment from outside the front end plate 12. Adjustment of the cap screws 34 is provided to vary the force exerted by a pair of concentric inner and outer compression springs 40 and 41, respectively, which are coaxial with the cap screws 34. The springs 40 and 41 are biased between the annular plate 37 and the bottom of a counter bore 42 thereby urging the piston 21 away from the annular plate 37.

The axial position of the annular plate 37 and thereby the annular piston 21 is adjusted by a plurality of adjustment screws 43 threaded into the through holes 44 in the front end plate 12 at locations on the circumferential center line of the annular plate 37 and spaced midway between the through holes 39 in the front end plate 12. Lock nuts 45 lock the adjustment screws 43 in plate.

The radial cavity 11 is adapted to be partially filled with a hydraulic fluid 46. Leakage of the fluid between the input housing 10 and the output shaft 24 is prevented by seals 47 and 48 mounted in the front end plate 12 and the rear end plate 13, respectively.

When the input housing 10 is rotated by a driving mechanism at a sufficient speed, centrifugal force will cause the fluid 46 to migrate radially outward. As the speed of the input housing 10 is increased, the speed of the fluid 46 will lag the speed of the housing due to the fluid's inertia. When the fluid speed becomes great enough, fluid pressure created by centrifugal force will act on a net annular piston area (equal to the area of the annular channel 18) opposing the clutch plates which will produce a force equal to and opposing the combined force of the inner and outer compression springs 40 and 41 exerted on the annular piston 21 in the disengaged state. A further increase in speed of the input housing 10, lagged by an increase in fluid speed and therefore also lagged by an increase in fluid pressure, will cause the fluid pressure to overcome the combined force of springs 40 and 41. As the fluid accelerates to approach the speed of the input housing, the fluid pressure will increase proportionally to the square of the fluid speed to gradually urge the annular piston to compress the first and second sets of clutch plates 19 and 22 together thereby engaging the clutch plates and operatively connecting the housing 10 and the shaft 24 to transmit power to the shaft 24. Thus, gradual engagement of the clutch is achieved as the speed of the input housing is increased.

Disengagement of the clutch will also be gradual as the housing 10 is decelerated. Fluid speed will lag the housing speed on deceleration to produce a gradual decline in fluid pressure. As the fluid pressure subsides, springs 40 and 41 will gradually urge the clutch plates 19 and 22 out of compression thereby providing gradual disengagement of the clutch.

The fluid 46 is shown in a radially outward position, as would be the case if it was rotating at a sufficient speed. The fluid level is represented by the line 49 and is adequate to provide cooling and lubrication to the clutch plates 19 and 22 during engagement and disengagement, when heat generated is maximum. A fusible plug 50 is mounted in the rear end plate 13. If jamming or overheating occurs, the heated fluid will melt the plug 49 thereby releasing the fluid pressure to disengage the clutch.

What is claimed is:

1. A clutch for connecting driving and driven mechanisms, comprising:

a rotatable housing adapted to be connected to said driving mechanism, said rotatable housing having a radial cavity adapted to be partially filled with a fluid;

clutch plates within said radial cavity and operatively connected to said rotatable housing and said driven mechanism;

a piston in said cavity having a net piston surface opposing said clutch plates which causes said piston to engage the clutch plates under the influence of centrifugal pressure generated in said fluid by rotation of said housing;

a ring member in said radial cavity mounted to said housing thereby defining an annular channel adjacent the outer perimeter of said radial cavity;

an annular plunger portion of said piston which is slidably mounted and sealed on its inside and outside diameters in said annular channel thereby providing said net piston surface opposing said clutch plates;

wherein said housing has spaced front and rear end plates and a cover spanning the plates;

a ball bearing and a seal mounted in each of said front and rear end plates;

an output shaft rotatably mounted in said ball bearings and seals and adapted to be connected to said driven mechanism, said output shaft being connected to a set of said clutch plates which are interleaved with another set of said clutch plates connected to said housing;

an annular plate adjacent said front end plate in said annular channel which is slidably connected to said annular plunger;

a compression spring biased between said annular plunger and said annular plate; and means for adjusting the axial position of said annular plate, whereby the spring force biasing said piston away from said clutch plates can be adjusted.

2. A clutch for connecting driving and driven mechanisms, comprising:

a housing connected to said driving mechanism for rotation therewith, said housing having a radial cavity partially filled with a fluid;

a hub mounted within said cavity for rotation independent of said housing, said hub being connected to said driven member;

clutch plates operatively connected to said housing and hub;

a piston in said cavity and being movable toward and away from said clutch plates, said piston having a net piston surface which causes said piston to move toward said clutch plates to engage the clutch under the influence of the centrifugal pressure of the fluid;

a ring member in said radial cavity mounted to said housing thereby defining an annular channel between the outside diameter of said ring member and the inside diameter of said housing;

an annular plunger portion of said piston which is slidably mounted in and sealed on its inside and outside diameters in said annular channel thereby providing said net piston surface;

an annular plate slidably connected to said annular plunger;

a compression spring biased between said annular plunger and said annular plate thereby biasing said piston away from said clutch plates; and means for adjusting the axial piston of said annular plate so that the spring force biasing said piston away from said clutch plates can be adjusted.

3. A clutch for connecting driving and driven mechanisms, comprising:

a rotatable housing connected to said driving mechanism and defining a radial cavity adapted to be partially filled with a fluid;

a first set of clutch plates in said cavity and connected for rotation with said housing;

a hub within said cavity mounted for rotation independent of said housing;

a second set of clutch plates in said cavity interleaved with said first set and connected for rotation with said hub;

an annular piston in said cavity including a portion adapted to engage said clutch plates and urge them together, said piston having a net piston surface opposing said clutch plates which causes said piston to move toward said clutch plates to engage the clutch plates under the influence of centrifugal pressure generated in said fluid by rotation of said housing;

means biasing said piston away from said clutch plates;

a ring member in said radial cavity mounted to said housing thereby defining a annular channel adjacent the outer perimeter of said radial cavity;

an annular plunger potion of said piston which is slidably mounted and sealed on its inside and outside diameters in said annular channel thereby providing said net piston surface opposing said clutch plates; and wherein said means for biasing said piston away from said clutch plates comprises:

an annular plate slidably connected to said annular plunger and being axially adjustable in said annular channel relative to said annular plunger; and a compression spring biased between said annular plunger and said annular plate.

4. A clutch in accordance with claim 3, wherein said housing has spaced front and rear end plates and a cover spanning the plates, further comprising a ball bearing and a seal mounted in each of said front and rear end plates and an output shaft connected to said hub which is rotataby mounted in said ball bearings and seals and is adapted to be connected to said driven mechanism.

* * * * *